O. HARDIN.
PISTON.
APPLICATION FILED JULY 15, 1913.

1,115,929.

Patented Nov. 3, 1914.

Witnesses.
E. R. Pollard
E. LeCornu

Inventor.
Otis Hardin
By
Cassell Severance
Atty.

UNITED STATES PATENT OFFICE.

OTIS HARDIN, OF SOMIS, CALIFORNIA.

PISTON.

1,115,929.  Specification of Letters Patent.  Patented Nov. 3, 1914.

Application filed July 15, 1913. Serial No. 779,117.

*To all whom it may concern:*

Be it known that I, OTIS HARDIN, a citizen of the United States, residing at Somis, in the county of Ventura and State of California, have invented certain new and useful Improvements in Pistons, of which the following is a specification.

This invention relates to improvements in pistons, and while it is adapted for use in connection with various mechanisms where pistons are necessary, it is particularly adapted for hydraulic purposes.

It is an object of the invention to provide a piston with packing material which is pressed outwardly with a yielding pressure whereby any wear upon the same will be taken up so that there will be no leakage past the piston.

It is also an object of the invention to provide a piston having head pieces spaced apart to receive packing between them without pinching the same, and to provide spring actuated pieces or shoes for forcing the packing against the wall of the cylinder in which the piston moves, to prevent leakage due to wear.

With these and other objects in view the invention comprises certain novel construction, combination and arrangements of parts, as will be hereinafter described and claimed.

Figure 1:
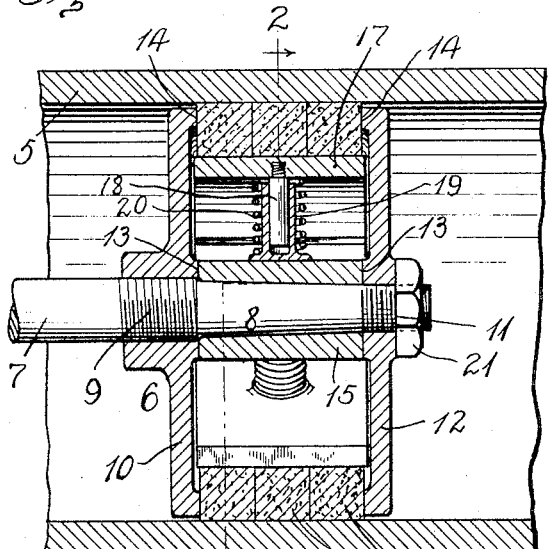
Figure 2:
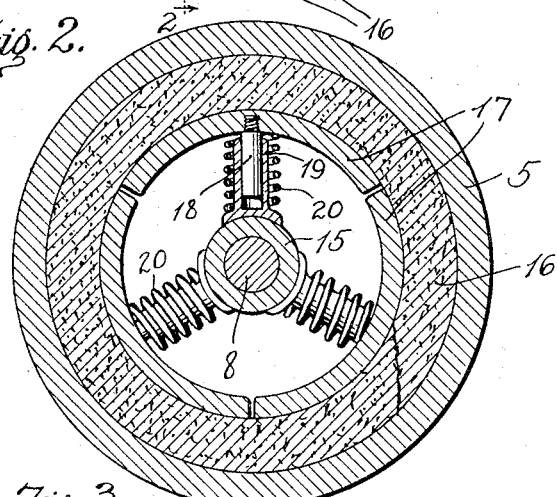
Figure 3:
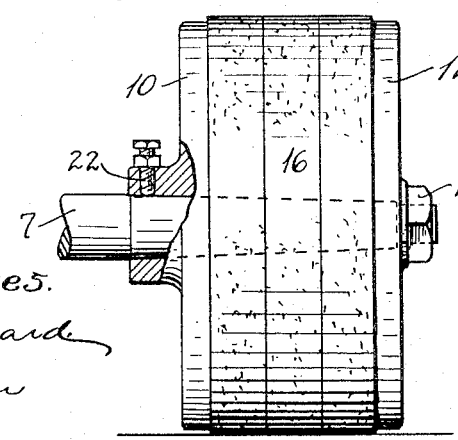

In the accompanying drawing forming a part of this specification Figure 1 is a central sectional view taken through a piston constructed in accordance with this invention, the piston rod being shown in side elevation. Fig. 2, is a transverse sectional view taken upon the line 2—2 of Fig. 1. Fig. 3, is a side elevation of the said piston a portion of the inner piston head being broken away and shown in section, to show a modified means of securing it to the piston rod.

While the piston of the present invention is well adapted for various uses, it is especially well suited for hydraulic use and in the drawing the invention has been illustrated as applied in a hydraulic pump, and the details and features of the invention will now be described reference being had thereto.

In the said drawing 5 indicates a cylinder in which moves a piston 6, carried by a piston rod 7. The rod 7 is usually tapered at the end as at 8 and at the inner end of the tapered portion 8, is a screw threaded portion 9 formed upon the piston rod 7. A piston head 10, has its hub portion interiorly screw threaded to engage the portion 9, for firmly securing it in place on the said rod 7. The outer reduced end of the piston rod 7 is also screw threaded as at 11 and a second piston head 12 is fitted and screwed thereon. Both the said piston heads 10 and 12 are provided on their inner faces with inner and outer projecting annular finished portions 13 and 14. A spacing sleeve 15 having a tapered bore to fit the taper of the piston rod 7, is arranged between the heads 10 and 12, so as to space them apart the exact width of the packing material which is to be placed between the annular edge portions 14.

The packing material employed is usually in the form of one or more packing rings of hydraulic packing, the heads 10 and 12 being preferably spaced to receive three of said rings 16, as shown in the drawing. To hold the packing rings 16 outwardly and in close contact with the surface of the cylinder 5, shoes 17 having curved body portions fitting the inner contour of the packing rings 16, are arranged within the said rings as shown in Figs. 1 and 2. Each of the said shoes has an inwardly extending stem 18, which extends into a hollow standard 19 formed on the outer surface of the spacing sleeve 15. Springs 20 surround the said standards 19, their inner ends bearing against the sleeve 15, while their outer ends press the shoes 17 outwardly. The shoes 17 are wide enough to project into the annular space upon the inner faces of the heads 10 and 12, between the projecting portions 13 and 14, so that the outward movement of the said shoes 17 is limited by the annular projections 14, the packing rings being continuously pressed outwardly until the said shoes reach the said projections 14. By that time the packing rings will become so worn that new ones ought to be substituted. The shoes are made long enough for their ends to nearly touch when new packing rings have been put in place, and thus there will only be small gaps between them when the shoes are in their extreme expanded positions, and the said shoes will be capable of exerting a continuous even pressure upon the packing practically entirely around the piston. A nut 21 applied to the end of the piston rod 7, holds the parts of the piston tightly in place. It will be observed however that the peripheral edges of the heads 10 and 12 cannot pinch the packing rings 16, because of the spacing sleeve 15, and that the spring pressed shoes are free to move outwardly against the said packing rings between the said heads.

As shown in Fig. 3, the inner head 10 may be secured to the piston rod 7, by a set screw 22, if desired, instead of being screw threaded thereon as shown in Fig. 1, without departing from the spirit of the invention.

The piston of the present invention is well adapted for use in pumping water or other materials. When the packing of hydraulic pistons become slightly worn, the liquids will readily leak past the same making it necessary to repack the same. With the piston of the present invention however, the packing will be continually forced outwardly against the wall of the cylinder, so as to take up the wear and prevent any leakage past the piston, until the shoes 17 reach the outer limit of their movement.

Although the piston is admirably adapted for hydraulic use with hydraulic packing, it should be understood however, that it is within the contemplation of the invention to use pistons made in accordance therewith for other purposes where pistons requiring packing means are needed. Such pistons are well adapted for use with steam or with air or other fluid pressure, either as actuating pistons or as driven pistons, all within the spirit and scope of the invention.

What is claimed is:—

A piston comprising heads carried on a piston rod and having inwardly projecting annular flanges, plungers movable within said flanges and limited thereby, means for forcing the plungers outwardly, and packing rings between the said annular flanges and resting on said plungers whereby they will be kept in their outermost positions.

In testimony whereof, I have hereunto set my hand, in presence of two witnesses.

OTIS HARDIN.

Witnesses:
 CASSELL SEVERANCE,
 LILLIE VOLLMER.